United States Patent [19]
Capelle

[11] Patent Number: 5,324,183
[45] Date of Patent: Jun. 28, 1994

[54] APPARATUS FOR PRODUCING A CONTROLLABLE, UNIFORM CONVEYING PRESSURE FOR PROCESSING HIGHLY VISCOUS RUBBER OR THERMOPLASTICS

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 24,346

[22] Filed: Mar. 1, 1993

[30] Foreign Application Priority Data

Mar. 6, 1992 [DE] Fed. Rep. of Germany ....... 4207088

[51] Int. Cl.$^5$ .......................... F04C 2/18; F04C 13/00
[52] U.S. Cl. ...................................... 418/88; 418/102; 418/206
[58] Field of Search ............... 418/88, 102, 205, 206; 425/376.1

[56] References Cited

U.S. PATENT DOCUMENTS

| | | | |
|---|---|---|---|
| 3,368,799 | 2/1968 | Sluijters | 418/102 |
| 4,336,213 | 6/1982 | Fox | 418/102 |

FOREIGN PATENT DOCUMENTS

| | | | |
|---|---|---|---|
| 312123 | 5/1919 | Fed. Rep. of Germany | 418/102 |
| 3615830 | 2/1991 | Fed. Rep. of Germany | |
| 4130312 | 12/1992 | Fed. Rep. of Germany | |

*Primary Examiner*—John J. Vrablik
*Attorney, Agent, or Firm*—Foley & Lardner

[57] ABSTRACT

The present invention relates to an apparatus for producing a controllable, uniform conveying pressure for processing highly viscous, temperature sensitive rubber or thermoplastics, consisting of two rotating conveying elements that form a toothlike sealing profile and are arranged on shafts in a housing. The root diameter of the conveying elements more or less corresponds to the diameter of the shaft sections that are axially adjacent to the conveying elements on either side and form bearing surface therefor. The radial faces of the conveying elements are thus avoided and so are the usually rather difficult sealing problems at these faces. By additionally providing either the shaft sections or the surrounding housing parts with return channels the channel volume of which decreases in the conveying direction, the axial sealing capacity of the gear pump is improved considerably.

4 Claims, 4 Drawing Sheets

APPARATUS FOR PRODUCING A CONTROLLABLE, UNIFORM CONVEYING PRESSURE FOR PROCESSING HIGHLY VISCOUS RUBBER OR THERMOPLASTICS

BACKGROUND OF THE INVENTION

The present invention relates to an apparatus for producing a controllable, uniform conveying pressure for processing highly viscous rubber or thermoplastics according to German Application No. P 41 30 312.1-15. An apparatus of the same general kind is disclosed in DE-PS 36 15 830.

If highly viscous materials such as certain types of rubber are to be processed by such an apparatus, major problems with the radial sealing of the gear faces will occur. This is the reason why such temperature sensitive materials have not been processed by gear pump type apparatuses so far.

Axial sealing of the shafts that take the gears by means of helical return threads is possible but not satisfactory in case of high pressures. The return thread is a helical groove worked into the shaft and forms a stationary and a rotary surface together with the inner shell of the housing that takes the shaft. The rotary surface is formed by the shaft itself as well as by the helical groove worked into the shaft.

If plasticized material penetrates into the helical groove a conveying process is effected by the material rolling off the stationary inner shell and the turning shaft. The conveying direction is determined by the choice of the helix angle of the return thread.

It is indispensable for the conveyance of temperature sensitive rubber to avoid the formation of dead corners or dead space in the apparatus because the rubber would be partially vulcanized there, which would contaminate the compound and, thus, render it unusable.

SUMMARY OF THE INVENTION

The present invention seeks to provide an apparatus for producing a controllable, uniform conveying pressure for processing highly viscous, temperature sensitive material, e.g., highly viscous rubber compounds or highly viscous thermoplastics, by eliminating all problems concerning the axial sealing at the shafts of the conveying elements. In particular, the invention seeks to considerably improve the conveying efficiency and sealing capacity of a return thread.

By designing the shaft sections on both sides of the teeth of the conveying element with a diameter that more or less corresponds to the root diameter of the gear, the radial gaps between the gear faces (i.e., in particular, the faces that actually reach from the root diameter of the gears to the proper shaft diameter) and the housing are eliminated, thus rendering measures to radially return the material from these gaps unnecessary because the radial gap or rather the radial faces themselves are avoided.

Since the parts of the shafts next to the gears have almost the same diameter as the root diameter of the gear-like conveying elements, it is possible to use relatively thick shafts that are able to transfer higher torques and which prove very favorable for processing highly viscous rubber compounds. Thick shafts do not bend even under high stress and permit, without becoming noticeably weaker, the arrangement of heating-/cooling bores, which offers further possibilities of advantageously using the apparatus for highly temperature sensitive materials. The shearing energy that is introduced into the rubber by the conveying process can thus be removed again by means of a cooling agent in the heating/cooling bores.

The sealing problem of the apparatus according to application no. P 41 30 312.1-15 is noticeably relieved by the provision of material return channels according to the present invention that can be worked into the shaft ends of the conveying elements. Owing to the minimization of the volume of the return channels worked into the shaft or into the housing surrounding the shaft contrary to the conveying direction, an almost complete sealing is obtained. Only a small annular gap towards the working area of the gear pump will remain. Thus, good sealing is obtained at that point. When due to the high pressure in the working area the plasticized rubber is pressed through the small annular gap that is required for the clearance between the shaft and the housing, the conveying pressure of the return thread will oppose this material.

The conveying characteristics and/or the level of the conveying pressure that can be obtained in a return thread increase proportionally to the length of the return channel in the conveying direction. The continuous reduction of the helical channel volume in the conveying direction leads to another considerable pressure increase in the channel. The highest pressure is produced in the conveying direction shortly before the channel end. The return channel runs out just before the shaft end in the conveying direction so that the returned material is pressed into the annular gap, thus opposing the pressure of the material which is pressed from the working area of the gear pump into the annular gap.

The material pressure in the working area is thus opposed by a high counterpressure from the return channels in case of product leakage.

BRIEF DESCRIPTION OF THE DRAWINGS

Exemplary embodiments of the invention are illustrated in the drawings, in which.

DETAILED DESCRIPTION OF THE PREFERRED EMBODIMENTS

Figure 1:
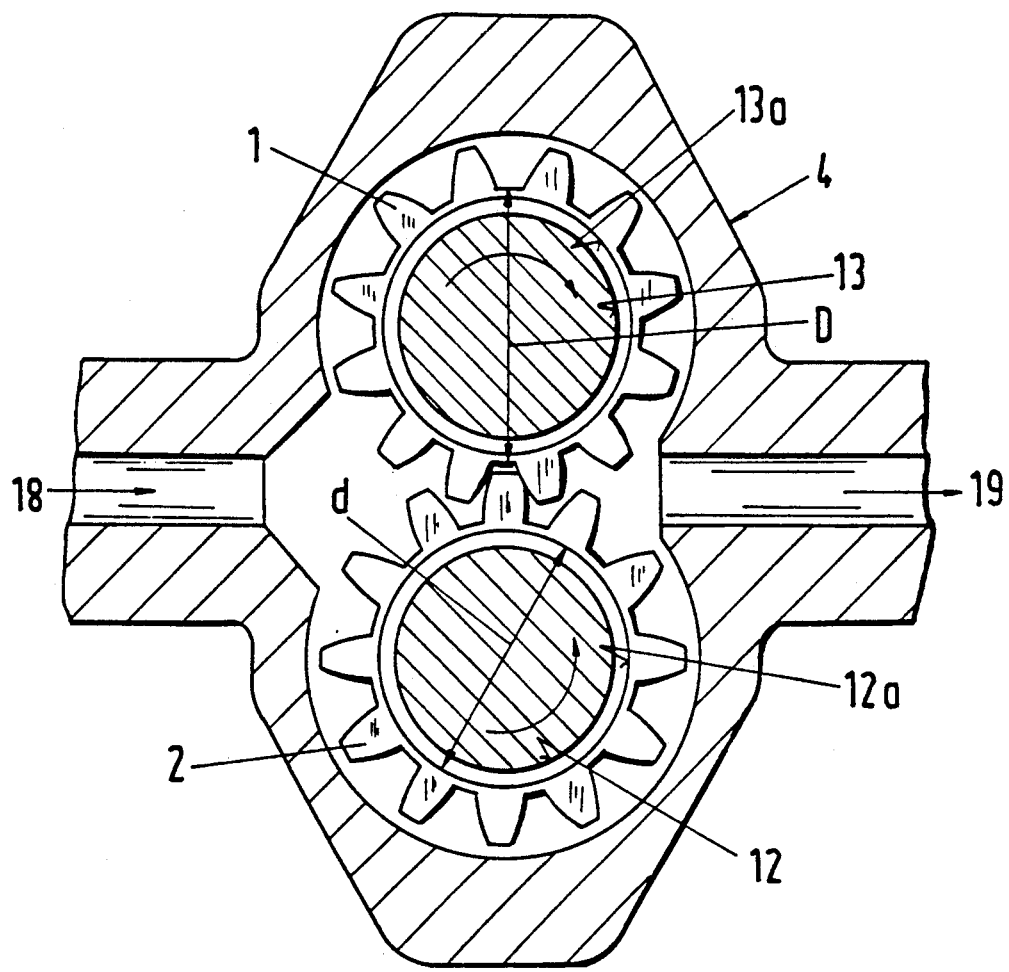
FIG. 1 is a cross-sectional view of the apparatus, taken on line I—I of FIG. 2.

FIG. 1 illustrates two toothed conveying elements 1 and 2 which form a sealing profile with each other and which are arranged in a housing 4. The housing 4 is provided with a material inlet opening 18 and an outlet opening 19.

Figure 2:
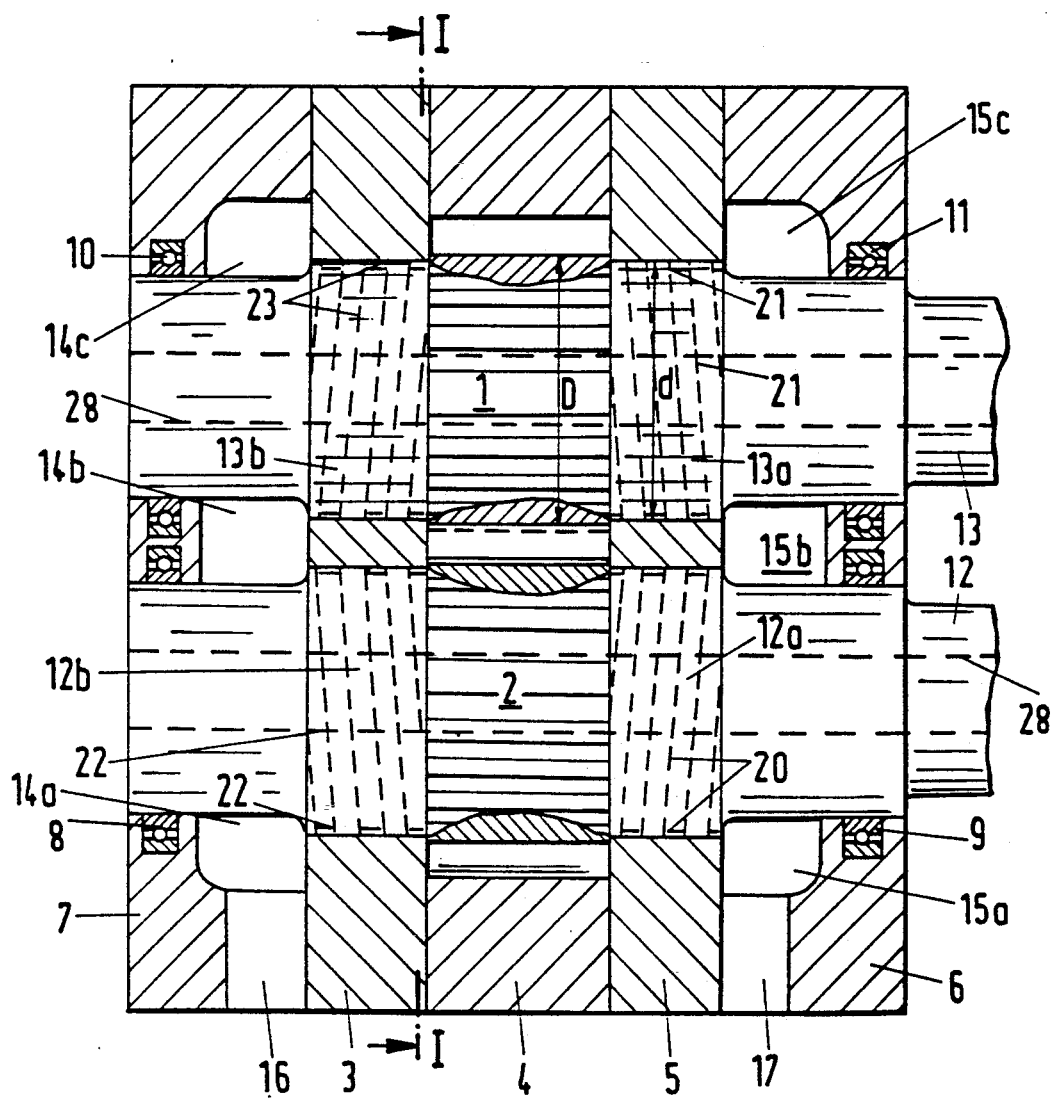
FIG. 2 is a top view of the longitudinal section of the apparatus.

As shown in both FIGS. 1 and 2, "D" refers to the root diameter of the conveying element 1, and "d" to the diameter of the shaft ends.

The housing 4 in which the conveying elements 1 and 2 are arranged is pressure-sealed on both sides by the sealing plates 3 and 5, which are fixed to the housing 4. The sealing plates 3 and 5 take up the shaft end sections 12a, 12b, and 13a, 13b.

Bearing plates 6 and 7 are attached to both sides of the sealing plates 3 and 5 by screw unions that are not shown. The bearing plates 6 and 7 support the bearings 8, 9, 10 and 11 on either side of the shaft sections 12 and 13.

The shaft sections 12a, 12b, and 13a, 13b are provided with helically designed return channels 20, 21, 22, 23, which serve to return material that has penetrated into the gap between the shaft sections 12a, 12b, and 13a, 13b, and the sealing plates 3 and 5 to the working area between the individual teeth of the conveying elements 1 and 2.

If, however, the conveying capacity of the return threads is insufficient, allowing material to penetrate into these gaps, the material will be collected in the leakage collection chambers 15a, 15b, and 15c and the leakage collection chambers 14a, 14b, and 14c at the opposite shaft ends, respectively.

The collected leakage material is removed from the apparatus via outlet channels 16 and 17 in order to prevent the material from penetrating into the shaft bearings 8, 9, 10 and 11 and causing damage at the bearings. Heating/cooling of the conveying elements 1 and 2 as well as of the adjacent shaft sections is effected via heating/cooling bores 28, which can be connected to a temperature control unit not depicted. Heating/cooling, in this case cooling of the conveying elements, is of great advantage because the conveying capacity of highly viscous types of rubber can be increased considerably without partial vulcanization at certain points that may, for example, be caused by an excessive temperature increase.

Radial sealing of the tooth faces themselves as well as of the areas of the gears that reach down to the actual shaft diameter constitutes a major problem, which can however be avoided. By designing the shaft sections 12a, 12b, and 13a, 13b with a diameter d that corresponds more or less to the root diameter D of the conveying elements 1 and 2, there is no need for sealing at these points since the critical faces themselves are avoided.

Manufacturing the toothed conveying elements 1 and 2 with the shaft sections 12, 12a, 12b, and 13, 13a, 13b in one piece is of great advantage.

Figure 3:
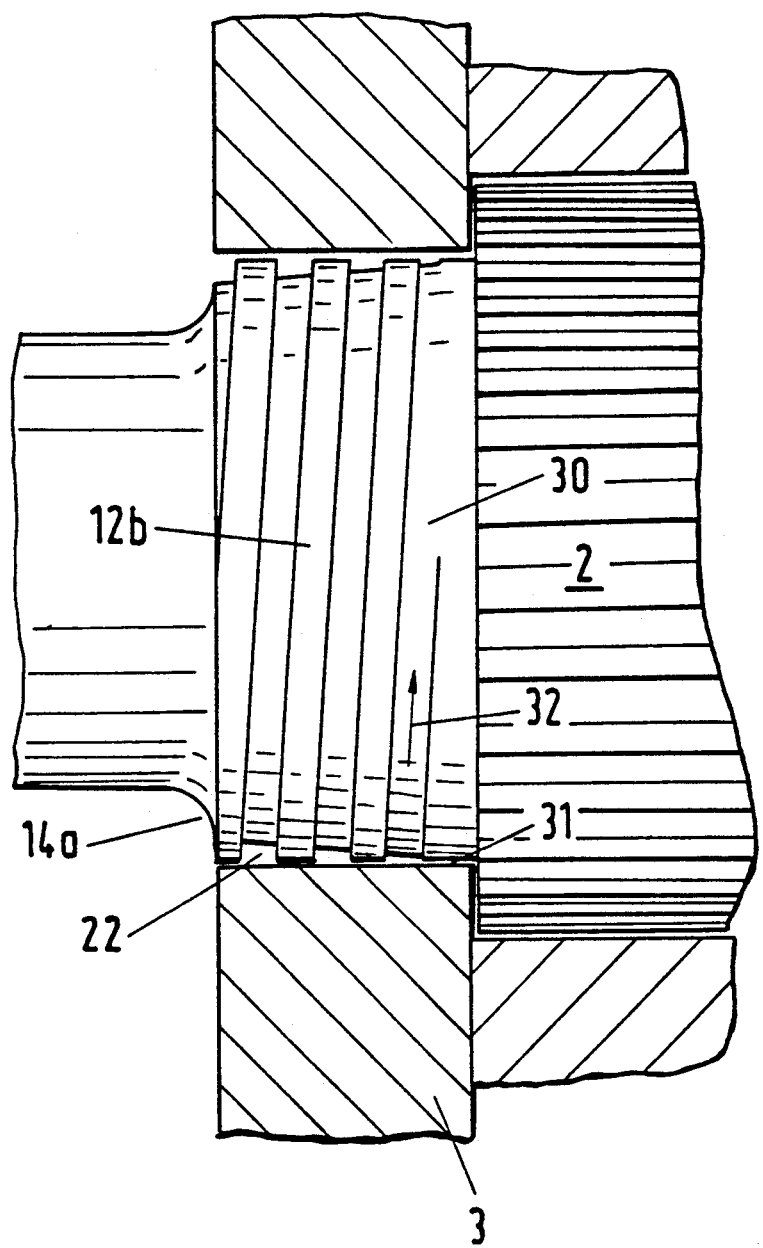
FIG. 3 is a view of the return channel in the shaft, the volume of the return channel decreasing contrary to the conveying direction.

FIG. 3 shows the shaft section 12b provided with the return channels 22 the channel depth of which are gradually decreased in the conveying direction indicated by the arrow 32 until running out to zero at point 30. An annular gap 31 remaining between the housing 3 and the shaft section 12b and approximately having the thickness of a clearance fit is depicted in the drawing in a scaled up or exaggerated manner.

Figure 4:
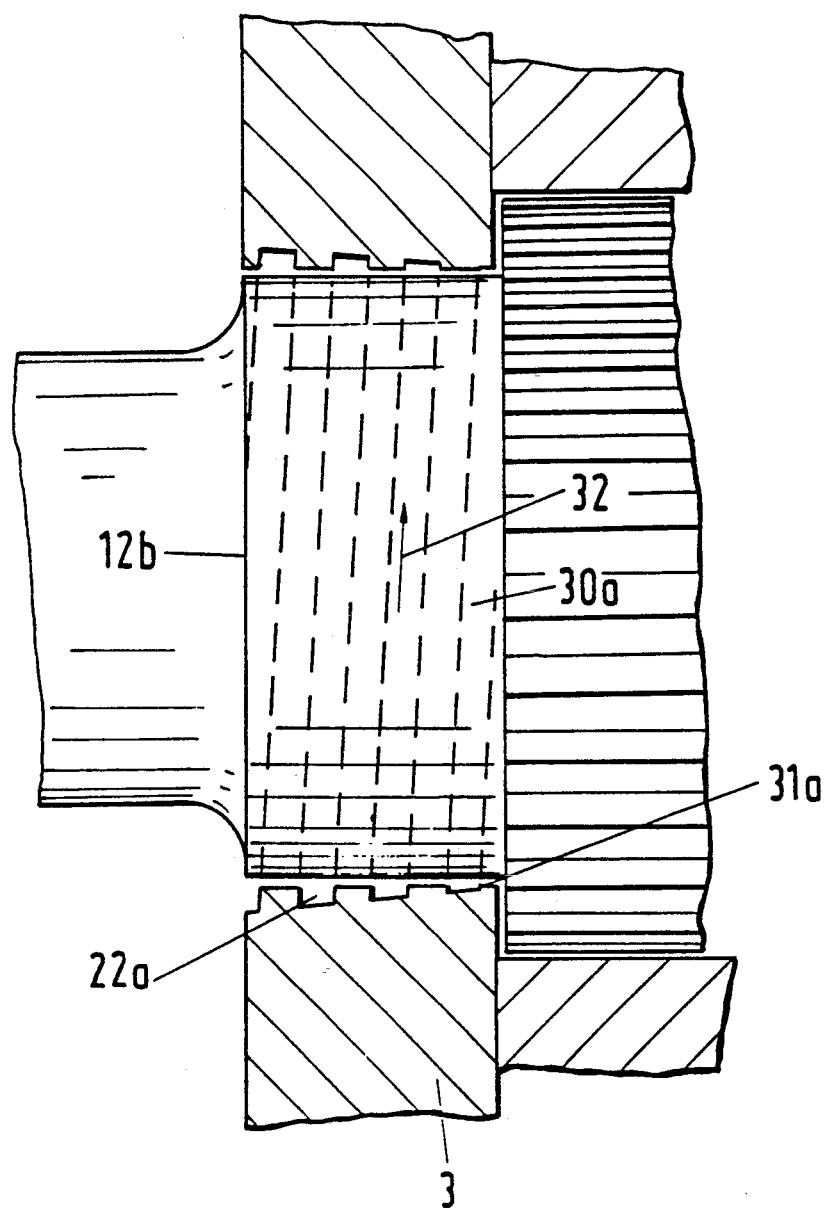
FIG. 4 is a view of the return channel in the sealing plates, the volume of the return channel decreasing contrary to the conveying direction of the return thread.

FIG. 4 illustrates a return channel 22a that has been worked into the housing 3 (covering plate 3). In this case, the shaft section 12b is shaped cylindrically. The depth of the return channel 22a continually decreases until reaching zero at point 30a. The annular gap 31a is also provided in this case.

The material that penetrates into the annular gaps 31 and 31a reaches the return channels 22 and 22a and is returned in the direction of the arrow 32 if there is enough material for starting the return process. The conveying pressure is continually increased by the decreasing channel depth 22, 22a.

What is claimed is:

1. Apparatus for providing a controllable, uniform conveying pressure for processing highly viscous rubber or thermoplastic material, comprising:

a housing provided with a material inlet and an outlet opening for material to be conveyed;

a pair of rotating conveying elements that form a toothlike sealing profile, each of said conveying elements being carried on a shaft the opposite ends of which are mounted for rotation in said housing, and means for driving said shafts and thus said conveying elements, said conveying elements having a root diameter;

said shafts including shaft sections axially adjoining said conveying elements on both sides thereof and serving to guide said conveying elements, said shaft section being mounted in stationary sealing plates secured to said housing and forming bearing surfaces for the peripheries of said shaft sections;

said shaft sections having a diameter that generally corresponds to but is slightly less than the root diameter of said conveying elements; and helical material return channels communicating with said peripheries of said shaft sections, said return channels being oriented so that material reaching said channels is conveyed back in the direction of said conveying elements, said channels being designed such that the channel volume is continually reduced in the conveying direction, reaching zero adjacent said conveying elements.

2. The apparatus of claim 1, wherein said return channels are formed in the peripheries of said shaft sections.

3. The apparatus of claim 1, wherein said return channels are formed in the bearing surfaces of said sealing plates, opposed to the peripheries of said shaft sections.

4. The apparatus of claim 1, wherein the channel volume is reduced by continually reducing the channel depth in the conveying direction.

* * * * *